(12) United States Patent
Fantinel et al.

(10) Patent No.: US 8,999,875 B2
(45) Date of Patent: Apr. 7, 2015

(54) PROCESS FOR PREPARING A SUPPORTED CATALYST SYSTEM FOR OLEFIN POLYMERIZATION, THE CATALYST SYSTEM AND ITS USE

(75) Inventors: Fabiana Fantinel, Verona (IT); Shahram Mihan, Bad Soden (DE); Rainer Karer, Kaiserslautern (DE); Volker Fraaije, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 31 days.

(21) Appl. No.: 13/700,098

(22) PCT Filed: May 26, 2011

(86) PCT No.: PCT/EP2011/002612
§ 371 (c)(1),
(2), (4) Date: Nov. 26, 2012

(87) PCT Pub. No.: WO2011/147573
PCT Pub. Date: Dec. 1, 2011

(65) Prior Publication Data
US 2013/0072652 A1    Mar. 21, 2013

Related U.S. Application Data

(60) Provisional application No. 61/398,368, filed on Jun. 24, 2010.

(30) Foreign Application Priority Data

May 28, 2010  (EP) ..................................... 10005630
Jun. 17, 2010  (EP) ..................................... 10006346

(51) Int. Cl.
| | | |
|---|---|---|
| C08F 4/653 | (2006.01) | |
| C08F 4/6592 | (2006.01) | |
| C08F 10/00 | (2006.01) | |
| C08F 210/16 | (2006.01) | |
| C08L 23/08 | (2006.01) | |
| C08F 4/619 | (2006.01) | |
| C08F 4/6192 | (2006.01) | |

(52) U.S. Cl.
CPC ........... *C08F 210/16* (2013.01); *C08F 4/61912* (2013.01); *C08F 4/61916* (2013.01); *C08F 4/61925* (2013.01); *C08L 23/0815* (2013.01); *Y10S 526/943* (2013.01)

(58) Field of Classification Search
CPC ............. C08F 4/65904; C08F 4/65908; C08F 4/65912; C08F 4/6592; C08F 10/00; C08F 4/64148; C08F 4/65916
USPC ................. 502/103, 113, 128, 132, 152, 167; 526/113, 114, 133, 160, 161, 165, 943
See application file for complete search history.

(56) References Cited

U.S. PATENT DOCUMENTS

| | | |
|---|---|---|
| 3,242,150 A | 3/1966 | Scoggin |
| 3,248,179 A | 4/1966 | Norwood |
| 5,688,734 A | 11/1997 | Speca et al. |
| 6,194,341 B1 | 2/2001 | Canich et al. |
| 6,417,302 B1 | 7/2002 | Bohnen |
| 6,589,905 B1 | 7/2003 | Fischer et al. |
| 7,053,160 B1 | 5/2006 | Bingel |
| 7,671,148 B2 | 3/2010 | Mihan |
| 2003/0228971 A1 | 12/2003 | Meverden et al. |

FOREIGN PATENT DOCUMENTS

| | | |
|---|---|---|
| CA | 2262493 | 9/1998 |
| CN | 1192752 A | 9/1998 |
| EP | 0789623 | 7/2003 |
| WO | WO-9611961 | 4/1995 |
| WO | WO-9512622 | 5/1995 |
| WO | WO-9600243 | 1/1996 |
| WO | WO-9728170 | 8/1997 |
| WO | WO-9736937 | 10/1997 |
| WO | WO-9822486 | 5/1998 |
| WO | WO-9840419 | 9/1998 |
| WO | WO-99/06414 | 2/1999 |
| WO | WO-0005277 | 2/2000 |
| WO | WO-0031090 | 6/2000 |

OTHER PUBLICATIONS

Chen, Yaofeng et al., "Halogen-Substituted 2,6-Bis(imino)pyridyl Iron and Cobalt Complexes: Highly Active Catalysts for Polymerization and Oligomerization of Ethylene", Organometallics, 2003, 22 2003, 4312-4321.
Ittel, Steven D. et al., "Late-Metal Catalysts for Ethylene Homo- and Copolymerization", Chem. Rev. 2000, 100 2000, 1169-1203.
Strauss, Steven H., "The Search for Larger and More Weakly Coordinating Anions", Chem. Rev. vol. 93(3) 1993, 927-942.
Weisenfeldt, Helga, "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrCl2", Journal of Organometallic Chemistry, 369 Elsevier Sequoia S.A., Lausanne—Printed in the Netherlands 1989, 359-370.

*Primary Examiner* — Caixia Lu (57) ABSTRACT

The invention refers to a process for preparing a supported catalyst system for the polymerization of olefins comprising at least one active catalyst component on a support, the process comprising
A) impregnating a dry porous support component with a mixture comprising at least one precatalyst, at least one cocatalyst, and a first solvent, such that the total volume of the mixture is from 0.8 to 2.0 times the total pore volume of the support component, and
B) thereafter, adding a second solvent in an amount of more than 1.5 times the total pore volume of the support component.
The invention refers further to a catalyst system made by this process and the use of this catalyst system for polymerization or copolymerization of olefins.

9 Claims, 3 Drawing Sheets

PROCESS FOR PREPARING A SUPPORTED CATALYST SYSTEM FOR OLEFIN POLYMERIZATION, THE CATALYST SYSTEM AND ITS USE

This application is the U.S. national phase of International Application PCT/EP2011/002612, filed May 26, 2011, claiming priority to European Patent Application 10005630.8 filed May 28, 2010, and European Patent Application 10006346.0 filed Jun. 17, 2010, and the benefit under 35 U.S.C. 119(e) of U.S. Provisional Application No. 61/398,368, filed Jun. 24, 2010; the disclosures of International Application PCT/EP2011/002612, European Patent Application 10005630.8, European Patent Application 10006346.0 and U.S. Provisional Application No. 61/398,368, each as filed, are incorporated herein by reference.

The present invention relates to a process for preparing a supported catalyst system for the polymerization of olefins, supported catalyst systems obtained in this way and a process for preparing polyolefins by polymerization or copolymerization of olefins in the presence of the supported catalyst system.

There are many ways in which application to a support can be carried out, i.e. the order in which the precatalyst(s) and the cocatalysts are applied to the support and the conditions under which this is carried out can be varied widely. Thus, the patent application WO 95/12622 A1 describes a heterogeneous polymerization catalyst composition produced by bringing a mixture of a metallocene and an aluminoxane in a solvent volume which does not exceed the total pore volume of the porous catalyst into contact with an inorganic oxide. The catalyst obtained in this way is said to give an improved morphology of the polymer. However, the process has the disadvantage that the catalyst system leads to problems in operability, e.g. deposits in the polymerization plant.

EP 0 789 623 B1, on the other hand, discloses a method for preparing a supported catalyst leading to reduced reactor fouling wherein the volume of the solution comprising a metallocene and an aluminoxane exceeds the pore total volume of the sample and is less than twice the total pore volume of the sample. These catalysts, however, have reduced activity.

Therefore, preparation methods for supported catalyst for olefin polymerization as described in prior art lead to different problems. The use of high amounts of solvent generally lead to a homogeneous distribution of the catalyst components on the support and have good operability in technical plants. However, with this method active components can be washed out and this is very critical when ratio of active metals should be exactly determined. On the other hand, the use of small amounts of solvent during supportation leads to good activity of the catalyst, but suffers from an inhomogeneous distribution of the catalyst components on the support, and thus leads to operability problems during polyolefin production in production plants.

It is therefore an object of the invention to improve the operability of catalyst systems especially in view of commercial polyolefin production plants.

Surprisingly, we have found that the homogeneous distribution of the catalyst components on the support can be improved by the new inventive supportation method as describe in the following.

We have found a process for preparing a supported catalyst system for the polymerization of olefins comprising at least one active catalyst component on a support, the process comprising the steps A) impregnating a dry porous support component with a mixture comprising at least one precatalyst, at least one cocatalyst, and a first solvent, such that the total volume of the mixture is from 0.8 to 2.0 times the total pore volume of the support component, and
B) thereafter, adding a second solvent in an amount of more than 1.5 times the total pore volume of the support component.

Furthermore, we have found the supported catalyst system prepared by the method and the use of the catalyst system for the polymerization or copolymerization of olefins.

The precatalysts are organic transition metal compounds, which can form active catalysts in polymerization of olefins. These are in principle all compounds of the transition metals of groups 3 to 12 of the Periodic Table of the elements or the lanthanides which contain organic groups and preferably form catalysts which are active in olefin polymerization after reaction with the hydrolyzed organoaluminum compound. These are usually compounds in which at least one monodentate or polydentate ligand is bound via σ or π bond to the central atom. Possible ligands include both ligands containing cyclopentadienyl radicals and ligands which are free of cyclopentadienyl radicals.

The process is especially suited for the preparation of a supported hybrid catalyst system which comprises an early transition metal compound and a late transition metal compound. Preferred is the preparation of a catalyst system comprising a metallocene, especially preferred a zirconocene or hafnocene as an early transition metal complex and iron or cobalt containing late transition metal complex, mostly preferred an iron complex bearing a tridentate ligand. A large number of examples for late transition metal complexes which are suitable for olefin polymerization are described in Chem. Rev. 2000, Vol. 100, No. 4, 1169 ff.

The process is particularly well-suited to organic transition metal compounds having at least one cyclopentadienyl ligand. Particularly useful complexes of this type are those of the formula (I)

where the substituents and indices have the following meanings:
$M^{I1}$ is titanium, zirconium, hafnium, vanadium, niobium, tantalum, chromium, molybdenum or tungsten or an element of group 3 of the Periodic Table or an element of the lanthanides;

$X^I$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, $-NR^{I6}_2$, $-OR^{I6}$, $-SR^{I6}$, $-SO_3R^{I6}$, $-OC(O)R^{I6}$, $-CN$, $-SCN$, β-diketonate, $-CO$, $BF_4^-$, $PF_6^-$ or bulky non-coordinating anions, wherein the organic radicals $X^I$ can also be substituted by halogens and/or at least one radical $R^{I6}$, and the radicals $X^I$ are optionally bonded with one another;

$E^{I1}$-$E^{I5}$ are each independently carbon, phosphorous or nitrogen, wherein not more than one $E^{I1}$ to $E^{I5}$ is phosphorus or nitrogen, preferably each $E^{I1}$ to $E^{I5}$ is carbon;

w is 1, 2 or 3 and, depending on the valence of $M^{I1}$, has the value at which the complex of the general formula (I) is uncharged;

$R^{I1}$ to $R^{I5}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6 to 20 carbon atoms in the aryl radical, halogen, $-NR^{I7}_2$, $-OR^{I7}$ or $-SiR^{I8}_3$, where the organic radicals $R^{I1}$ to $R^{I5}$ may also be substituted by halogens and/or two vicinal radicals $R^{I1}$ to $R^{I5}$ may also be joined to form a five-, six- or seven-membered ring, and/or two vicinal radicals $R^{I1}$ to $R^{I5}$ are joined to form a five-, six- or seven-membered heterocycle which comprises at least one atom selected from the group consisting of nitrogen, phosphorus, oxygen and sulphur;

$R^{I6}$ and $R^{I7}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{I6}$ and $R^{I7}$ may also be substituted by halogens and/or two radicals $R^{I6}$ and $R^{I7}$ may also be joined to form a five-, six- or seven-membered ring, or $SiR^{I8}_3$;

the radicals $R^{I8}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R_{I8}$ may also be substituted by halogens and/or two radicals $R^{18}$ may also be joined to form a five-, six- or seven-membered ring; and $Z^I$ is $X^I$ or where the radicals $R^{I9}$ to $R^{I13}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6 to 20 carbon atoms in the aryl radical, halogen, $-NR^{II4}_2$, $-OR^{II4}$ or $-SiR^{II5}_3$, where the organic radicals $R^{I9}$ to $R^{I13}$ may also be substituted by halogens and/or two vicinal radicals $R^{I9}$ to $R^{I13}$ may also be joined to form a five-, six- or seven-membered ring, and/or two vicinal radicals $R^{I9}$ to $R^{I13}$ are joined to form a five-, six- or seven-membered heterocycle which comprises at least one atom selected from the group consisting of nitrogen, phosphorus, oxygen and sulphur;

$R^{I14}$ are identical or different and are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{I14}$ may also be substituted by halogens and/or two radicals $R^{I14}$ may also be joined to form a five-, six- or seven-membered ring, or $SiR^{I15}$;

$R^{I15}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{I15}$ may also be substituted by halogens and/or two radicals $R^{I15}$ may also be joined to form a five-, six- or seven-membered ring;

$E^{I6}$-$E^{I10}$ are each independently carbon, phosphorous or nitrogen, wherein not more than one $E^{I1}$ to $E^{I5}$ is phosphorus or nitrogen, preferably each $E^{I1}$ to $E^{I5}$ is carbon;

or the radicals $R^{I4}$ and $Z^I$ together form an -$L^I_y$-$A^I$- group, where $L^I$ is $=BR^{I16}$, $=BNR^{I16}R^{I17}$, $=AlR^{I16}$, $-Ge-$, $-Sn-$, $-O-$, $-S-$, $=SO$, $=SO_2$, $=NR^{I16}$, $=CO$, $=PR^{I16}$ or $=P(O)R^{I16}$, where $R^{I16}$-$R^{I21}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{I16}$-$R^{I21}$ may also be substituted by halogens and/or two radicals $R^{I16}$-$R^{I21}$ may also be joined to form a five-, six- or seven-membered ring, and $M^{I2}$-$M^{I4}$ are each silicon, germanium or tin, preferably silicon, $A^I$ is $-O-$, $-S-$, $=O$, $=S$, $=NR^{I22}$, $-O-R^{I22}$, $-NR^{I22}_2$, $-PR^{I22}_2$ or an unsubstituted, substituted or fused, heterocyclic ring system, where the radicals $R^{I22}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $Si(R^{I23})_3$, where the organic radicals $R^{I22}$ may also be substituted by halogens and/or two radicals $R^{I22}$ may also be joined to form a five-, six- or seven-membered ring, $R^{I23}$ is hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{I23}$ may also be substituted by halogens and/or two radicals $R^{I23}$ may also be joined to form a five-, six- or seven-membered ring, v is 1 or when $A^I$ is an unsubstituted, substituted or fused, heterocyclic ring system may also be 0, or the radicals $R^{I4}$ and $R^{I12}$ together form an -L- group.

Such complexes can be synthesized by methods known per se, with preference being given to reacting the appropriately substituted, cyclic hydrocarbon anions with halides of titanium, zirconium, hafnium or chromium.

$A^I$ can, for example together with the bridge $L^I$, form an amine, ether, thioether or phosphine. $A^I$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups, which can contain from 1 to 4 nitrogen atoms and/or a sulfur or oxygen atom as ring atoms in addition to carbon atoms, are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups, which can contain from one to four nitrogen atoms and/or a phosphorus atom, are 2-pyridinyl, 2-phosphabenzolyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^I$ in the general formula (I) are preferably identical and are preferably fluorine, chlorine, bromine, $C_1$-$C_7$-alkyl or aralkyl, in particular chlorine, methyl or benzyl.

This type of complexes of the formula (I) also includes compounds having at least one ligand which is formed by a cyclopentadienyl or heterocyclopentadienyl and a fused-on heterocycle, with the heterocycles preferably being aromatic and preferably containing nitrogen and/or sulfur. Such compounds are described, for example, in WO 98/22486. These are, in particular, dimethylsilanediyl(2-methyl-4-phenylindenyl)(2,5-dimethyl-N-phenyl-4-azapentalene)zirconium dichloride, dimethylsilanediylbis(2-methyl-4-phenyl-4-hydroazulenyl)zirconium dichloride, dimethylsilanediylbis(2-ethyl-4-phenyl-4-hydroazulenyl)zirconium dichloride, bis(2,5-dimethyl-N-phenyl-4-azapentalene)zirconium dichloride or (indenyl)(2,5-dimethyl-N-phenyl-4-azapentalene)zirconium dichloride.

Among the complexes of the general formula (I), preference is given to (Ia)

(Ib)

(Id)

where the variables have the same meaning like in formula (I).

Among the complexes of the formula (Ia), preference is given to those in which $M^{I1}$ is zirconium, hafnium or chromium, $X^I$ is fluorine, chlorine, $C_1$-$C_4$-alkyl or benzyl, or two radicals $X^A$ form a substituted or unsubstituted butadiene ligand;

t is 0 in the case of chromium and otherwise 1 or 2, preferably 2;

$R^{I1}$ to $R^{I5}$ are each hydrogen, $C_1$-$C_8$-alkyl, $C_6$-$C_{10}$-aryl, $NR^{I8}{}_2$, $OSiR^{I8}{}_3$ or $Si(R^{I8})_3$;

$R^{I9}$ to $R^{I13}$ are each hydrogen, $C_1$-$C_8$-alkyl or $C_6$-$C_{10}$-aryl, $NR^{I4}{}_2$, $OSiR^{I14}{}_3$ or $Si(R^{I14})_3$; and $R^{I8}$ and $R^{I14}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{I8}$ and $R^{I14}$ may also be substituted by halogens and/or two radicals $R^{I8}$ or $R^{I14}$ may also be joined to form a five-, six- or seven-membered ring, or two radicals $R^{I1}$ to $R^{I5}$ and/or $R^{I9}$ to $R^{I13}$ together with the cyclopentadienyl ring form an indenyl, fluorenyl or substituted indenyl or fluorenyl system.

Particularly useful complexes of the formula (Ia) are ones in which the cyclopentadienyl radicals are identical.

Examples of particularly useful complexes of the formula (Ia) are those in which
$M^{I1}$ is zirconium or hafnium and
$X^I$ is fluorine, chlorine, $C_1$-$C_4$-alkyl or benzyl, or two radicals $X^I$ form a substituted or unsubstituted butadiene ligand,
t is 2,
$R^{I1}$ to $R^{I5}$ are identical or different and are each hydrogen, $C_1$-$C_8$-alkyl, $C_6$-$C_{10}$-aryl, and
$R^{I9}$ to $R^{I13}$ are identical or different and are each hydrogen, $C_1$-$C_8$-alkyl or $C_6$-$C_{10}$-aryl,
$R^{I8}$ and $R^{I14}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{I8}$ and $R^{I14}$ may also be substituted by halogens and/or two radicals $R^{I8}$ or $R^{I14}$ may also be joined to form a five-, six- or seven-membered ring, or two radicals $R^{I1}$ to $R^{I5}$ and/or $R^{I9}$ to $R^{I13}$ together with the $C_5$ ring form an indenyl, fluorenyl or substituted indenyl or fluorenyl system.

Specific examples are: pos bis(cyclopentadienyl)zirconium dichloride, bis(indenyl)zirconium dichloride, bis(fluorenyl)zirconium dichloride, bis(tetrahydroindenyl)zirconium dichloride, bis(pentamethylcyclopentadienyl) zirconium dichloride, bis(trimethylsilylcyclopentadienyl) zirconium dichloride, bis(trimethoxysilylcyclopentadienyl) zirconium dichloride, bis(ethylcyclopentadienyl)zirconium dichloride, bis(isobutylcyclopentadienyl)zirconium dichloride, bis(3-butenylcyclopentadienyl)zirconium dichloride, bis(methylcyclopentadienyl)zirconium dichloride, bis(1,3-di-tert-butylcyclopentadienyl)zirconium dichloride, bis(trifluoromethylcyclopentadienyl)zirconium dichloride, bis(tert-butylcyclopentadienyl)zirconium dichloride, bis(n-butylcyclopentadienyl)zirconium dichloride, bis(1-n-butyl-3-methyl cyclopentadienyl)zirconium dichloride, bis(phenylcyclopentadienyl)zirconium dichloride, bis(N,N-dimethyl aminomethylcyclopentadienyl)zirconium dichloride, bis(1,3-dimethylcyclopentadienyl)zirconium dichloride, bis(1-n-butyl-3-methylcyclopentadienyl)zirconium dichloride, (cyclopentadienyl)(methylcyclopentadienyl)zirconium dichloride, (cyclopentadienyl)(n-butylcyclopentadienyl)zirconium dichloride, (methylcyclopentadienyl)(n-butylcyclopentadienyl)zirconium dichloride, (cyclopentadienyl)(1-methyl-3-n-butylcyclopentadienyl)zirconium dichloride, bis(tetramethylcyclopentadienyl)zirconium dichloride, bis(cyclopentadienyl)hafnium dichloride, bis(indenyl)hafnium dichloride, bis(fluorenyl)hafnium dichloride, bis(tetrahydroindenyl)hafnium dichloride, bis(pentamethyl cyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butyl cyclopentadienyl)hafnium dichloride, bis(n-butylcyclopentadienyl)hafnium dichloride, bis(phenyl cyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butyl cyclopentadienyl) hafnium dichloride, (cyclopentadienyl)(1-methyl-3-n-butylcyclopentadienyl)hafnium dichloride, bis (tetramethylcyclopentadienyl)hafnium dichloride, and also the corresponding dimethylzirconium and dimethylhafnium compounds.

Further preferred complexes of the formula (Ib) are bridged bisindenyl complexes in the rac or pseudorac form, where the term pseudorac refers to complexes in which the two indenyl ligands are in the rac arrangement relative to one another when all other substituents of the complex are disregarded.

Further examples of particularly useful complexes (Ib) are dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl) zirconium dichloride, ethylenebis(indenyl)zirconium dichloride, ethylenebis(tetrahydroindenyl)zirconium dichloride, tetramethylethylene-9-fluorenylcyclopentadienyl zirconium dichloride, dimethylsilanediylbis(tetramethylcyclopentadienyl)zirconium dichloride, dimethylsilanediylbis(3-trimethylsilylcyclopentadienyl)zirconium dichloride, dimethylsilanediylbis(3-methylcyclopentadienyl)zirconium dichloride, dimethylsilanediylbis(3-n-butylcyclopentadienyl)zirconium dichloride, dimethylsilanediylbis(3-tert-butyl-5-methylcyclopentadienyl)zirconium dichloride, dimethylsilanediylbis (3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride, dimethylsilanediylbis(2-ethyl-4,5-benzindenyl)zirconium dichloride, methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl) zirconium dichloride, dimethylsilanediylbis(2-methyl-4-(1-naphthyl)indenyl)zirconium dichloride, dimethylsilanediylbis(2-ethyl-4-(1-naphthyl)indenyl)zirconium dichloride, dimethylsilanediylbis(2-propyl-4-(1-naphthyl)indenyl)zirconium dichloride, dimethylsilanediylbis(2-i-butyl-4-(1-naphthyl)indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4[p-trifluoromethylphenyl]indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butylphenyl]indenyl)zirconium dichloride, diethylsilanediylbis(2-methyl-4-[4'-tert-butylphenyl]indenyl)zirconium dichloride, dimethylsilanediylbis(2-ethyl-4-[4'-tert-butyl phenyl]indenyl)zirconium dichloride, dimethylsilanediylbis(2-propyl-4-[4'-tert-butylphenyl]indenyl) zirconium dichloride, dimethylsilanediylbis(2-isopropyl-4-[4'-tert-butylphenyl]indenyl) zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthyl)indenyl)zirconium dichloride, dimethylsilanediyl(2-isopropyl-4-[4'-tert-butylphenyl]indenyl)(2-methyl-4-[4'-tert-butylphenyl]indenyl)zirconium dichloride, dimethylsilanediyl(2-isopropyl-4-[4'-tert-butylphenyl]indenyl)(2-ethyl-4-[4'-tert-butylphenyl]indenyl)zirconium dichloride, dimethylsilanediyl(2-isopropyl-4-[4'-tert-butylphenyl]indenyl)(2-methyl-4-[3',5'-bis-tert-butylphenyl] indenyl)zirconium dichloride, dimethylsilanediyl(2-isopropyl-4-[4'-tert-butylphenyl]indenyl)(2-methyl-4-[1'-naphthyl]indenyl)zirconium dichloride and ethylene(2-isopropyl-4-[4'-tert-butylphenyl]indenyl)(2-methyl-4-[4'-tert-butylphenyl]indenyl)zirconium dichloride, and also the corresponding dimethylzirconium, monochloromono(alkylaryloxy)zirconium and di(alkylaryloxy)zirconium compounds. The complexes are preferably used in the rac form.

The preparation of such systems is disclosed, for example, in WO 97/28170 A1.

Such complexes can be synthesized by methods known per se, with preference being given to reacting the appropriately substituted, cyclic hydrocarbon anions with halides of titanium, zirconium, hafnium, vanadium, niobium, tantalum or chromium. Examples of appropriate preparative methods are described, inter alia, in the Journal of Organometallic Chemistry, 369 (1989), 359-370.

Suitable as a second active catalyst components are late transition metal complexes of the general formula (II), (II)

wherein the variables have the following meaning:

$E^{II1}$-$E^{II3}$ independently of one another are carbon, nitrogen or phosphorus, preferably carbon, $R^{II1}$-$R^{II3}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{II1}_2$, $-OR^{II1}$, or $-SiR^{II2}_3$ or a five-, six- or seven-membered heterocycle, which comprises at least one atom from the group consisting of nitrogen, phosphorus, oxygen and sulfur, where the radicals $R^{II1}$ to $R^{II3}$ may also be substituted by halogen, $-NR^{II1}_2$, $OR^{II1}$, or $-SiR^{II2}_3$ and/or two radicals $R^{II1}$ to $R^{II3}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{II11}$ may also be substituted by halogens and/or two radicals $R^{II11}$ may also be joined to form a five-, six- or seven-membered ring, or $SiR^{II12}_3$ and $R^{II12}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{II12}$ may also be substituted by halogens and/or two radicals $R^{II12}$ may also be joined to form a five-, six- or seven-membered ring;

u independently of one another is 0 if the respective radical is bound to nitrogen or phosphorous and 1 if the respective radical is bound to carbon, $R^{II4}$, $R^{II5}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{II1}_2$, or $-SiR^{II12}_3$, where the radicals $R^{II4}$ and $R^{II5}$ may also be substituted by halogen and/or two radicals $R^{II4}$ and $R^{II5}$, may be joined to form a preferably 5-, 6- or 7-membered ring or a preferably 5-, 6- or 7-membered heterocycle which comprises at least one atom selected from the group consisting of nitrogen, phosphorus, oxygen and sulfur, v independently of one another, are 0 or 1, and when v is 0 the bond between N and the carbon atom bearing radical $R^{II4}$ is a double bond, $R^{II6}$ to $R^{II10}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{II1}_2$, $-OR^{II1}$ or $-SiR^{II12}_3$, where the organic radicals $R^{II6}$ to $R^{II10}$ may also be substituted by halogens and/or two vicinal radicals $R^{II6}$ to $R^{II10}$ may also be joined to form a five-, six- or seven-membered ring, and/or two vicinal radicals $R^{II6}$ to $R^{II10}$ are joined to form a five-, six- or seven-membered heterocycle which comprises at least one atom selected from the group consisting of nitrogen, phosphorus, oxygen and sulfur, $M^{II}$ is iron or cobalt, preferably iron, $X^{II}$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, $-NR^{II13}_2$, $-OR^{II13}$, $-SR^{II13}$, $-SO_3R^{II13}$, $-OC(O)R^{II13}$, $-CN$, $-SCN$, β-diketonate, $-CO$, $BF_4^-$, $PF_6^-$ or bulky non-coordinating anions, wherein the organic radicals $X^{II}$ can also be substituted by halogens and/or at least one radical $R^{II13}$, and the radicals $X^{II}$ are optionally bonded with one another, $R^{II13}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{II14}_3$, wherein the organic radicals $R^{II13}$ can also be substituted by halogens, and/or in each case two radicals $R^{II13}$ can also be bonded with one another to form a five- or six-membered ring, $R^{II14}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{II14}$ can also be substituted by halogens, and/or in each case two radicals $R^{II14}$ can also be bonded with one another to form a five- or six-membered ring, s is 1, 2, 3 or 4, $D^{II}$ is an uncharged donor and t is 0 to 4.

The substituents $R^{II1}$-$R^{II3}$ can be varied within a wide range. Possible carboorganic substituents $R^{II1}$-$R^{II3}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear $C_1$-$C_{10}$-alkyl groups as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{40}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinal radicals $R^{II1}$ to $R^{II3}$ are optionally joined to form a 5-, 6- or 7-membered carbon ring or a five-, six- or seven-membered heterocycle containing at least one atom from the group consisting of N, P, O and S and/or the organic radicals $R^{II1}$-$R^{II3}$ are unsubstituted or substituted by halogens such as fluorine, chlorine or bromine. Furthermore, $R^{II1}$-$R^{II3}$ can also be amino $NR^{II11}_2$ or $N(SiR^{II12}_3)_2$, alkoxy or aryloxy $OR^{II11}$, for example dimethylamino, N-pyrrolidinyl, picolinyl, methoxy, ethoxy or isopropoxy or halogen such as fluorine, chlorine or bromine.

Preferred radicals $R^{II1}$-$R^{II3}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The substituents $R^{II4}$ and $R^{II5}$ can also be varied within a wide range. Possible carboorganic substituents $R^{II4}$ and $R^{II5}$ are, for example, the following: hydrogen, $C_1$-$C_{22}$-alkyl which is linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which is unsubstituted or bears a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which is linear, cyclic or branched and in which the double bond is internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which is may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{II4}$ and $R^{II5}$ are unsubstituted or substituted by halogens such as fluorine, chlorine or bromine. Furthermore, $R^{II4}$ and $R^{II5}$ can be amino $NR^{II11}_2$ or $N(SiR^{II12}_3)_2$, for example dimethylamino, N-pyrrolidinyl or picolinyl. Possible radicals $R^{II12}$ in organosilicon substituents $SiR^{II12}_3$ are the same carboorganic radicals as described above for $R^{II1}$-$R^{II3}$ in formula (II), where two radicals $R^{II12}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{II12}_3$ radicals can also be bound via nitrogen to the carbon bearing them.

Preferred radicals $R^{II4}$ are hydrogen, methyl, ethyl, n-propyl, isopropyl, n-butyl, isobutyl, tert-butyl, n-pentyl, n-hexyl, n-heptyl, n-octyl or benzyl, in particular hydrogen or methyl.

The variable v denotes the number of $R^{II5}$ radicals. It is especially preferred that v is 0 and $R^{II5}$ forms a double bond to the nitrogen atom bearing the aryl substituent.

The substituents $R^{II6}$-$R^{II10}$ can be varied within a wide range. Possible carboorganic substituents $R^{II6}$-$R^{II10}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinakl radicals $R^{II6}$-$R^{II10}$ are optionally joined to form a 5-, 6- or 7-membered ring and/or a five-, six- or seven-membered heterocycle containing at least one atom from the group consisting of N, P, O and S and/or the organic radicals $R^{II6}$-$R^{II10}$ are unsubstituted or substituted by halogens such as fluorine, chlorine or bromine. Furthermore, $R^{II6}$-$R^{II10}$ can also be amino $NR^{II11}_2$ or $N(SiR^{II12}_3)_2$, alkoxy or aryloxy $OR^{II11}$, for example dimethylamino, N-pyrrolidinyl, picolinyl, methoxy, ethoxy or isopropoxy or halogen such as fluorine, chlorine or bromine. Possible radicals $R^{II12}$ in organosilicon substituents $SiR^{II12}_3$ are the same carboorganic radicals as have been described above for in formula (II).

Preferred radicals $R^{II6}$, $R^{II7}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{II6}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{II7}$ are each a halogen such as fluorine, chlorine or bromine. Particular preference is given to $R^{II6}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{II7}$ each being a halogen such as fluorine, chlorine or bromine.

Preferred radicals $R^{II8}$-$R^{II10}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. It is in particular preferred, that $R^{II9}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{II8}$ and $R^{II10}$ are each hydrogen.

In the most preferred embodiment the radicals $R^{II8}$ and $R^{II10}$ are identical, $R^{II6}$ are identical, $R^{II9}$ are identical, and $R^{II10}$ are identical.

The ligands $X^{II}$ result, for example, from the choice of the appropriate starting metal compounds used for the synthesis of the cobalt or iron complexes, but can also be varied afterwards. Possible ligands $X^{II}$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^{II}$. As further ligands $X^{II}$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_6)_4^-$. Amides, alkoxides, sulfonates, carboxylates and -diketonates are also particularly useful ligands $X^{II}$. Some of these substituted ligands $X^{II}$ are particularly preferably used since they are obtainable from cheap and readily available starting materials. Thus, a particularly preferred embodiment is that in which $X^{II}$ is dimethylamide, methoxide, ethoxide, isopropoxide, phenoxide, naphthoxide, triflate, p-toluenesulfonate, acetate or acetylacetonate.

The number s of the ligands $X^{II}$ depends on the oxidation state of $M^{II}$. The number s can thus not be given in general terms. The oxidation state of $M^{II}$ in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

$D^{II}$ is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands $D^{II}$ can be from 0 to 4 and is often dependent on the solvent in which the iron complex is prepared and the time for which the resulting complexes are dried and can therefore also be a nonintegral number such as 0.5 or 1.5, in particular, t is 0, 1 or 2.

Suitable compounds as cocatalysts are activating compounds which are able to react with the transition metal complexes to convert them into a catalytically active or more active compound. Such activating compounds are, for example, aluminoxanes, strong uncharged Lewis acids, ionic compounds having Lewis-acid cations or ionic compounds containing Brönsted acids as cations. For activation of both the at least two active catalyst compounds either the same kind of cocatalyst can be used or different cocatalysts can be used. In case of metallocenes and tridendate iron complexes aluminoxanes are especially preferred.

Particularly useful aluminoxanes are open-chain or cyclic aluminoxane compounds of the general formula (IIIA) or (IIIB)

where $R^{III}$ are each, independently of one another, a $C_1$-$C_6$-alkyl group, preferably a methyl, ethyl, butyl or isobutyl group and I is an integer from 1 to 40, preferably from 4 to 25.

A particularly useful aluminoxane compound is methyl aluminoxane (MAO).

Furthermore modified aluminoxanes in which some of the hydrocarbon radicals have been replaced by hydrogen atoms or alkoxy, aryloxy, siloxy or amide radicals can also be used in place of the aluminoxane compounds of the formula (IIIA) or (IIIB) as activating compound. Boranes and boroxines are particularly useful as activating compound, such as trialkylborane, triarylborane or trimethylboroxine. Particular preference is given to using boranes which bear at least two perfluorinated aryl radicals. More preferably, a compound selected from the list consisting of triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane is used, most preferably the activating compound is tris(pentafluorophenyl)borane. Particular mention is also made of borinic acids having perfluorinated aryl radicals, for example $(C_6F_5)_2BOH$. Compounds containing anionic boron heterocycles as described in WO 97/36937 A1 incorporated hereto by reference, such as for example dimethyl anilino borato benzenes or trityl borato benzenes, can also be used suitably as activating compounds.

Further suitable activating compounds are listed in WO 00/31090 A1 and WO 99/06414 A1.

Examples are for such activating compound are strong, uncharged Lewis acids, ionic compounds having Lewis-acid cations or an ionic compounds containing Brönsted acids as cations, e.g. tris(pentafluorophenyl)borane, tetrakis(pentafluorophenyl)borate or salts of N,N-dimethylanilinium.

Preferred as activating compounds are further metal compounds such as methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, preferably n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

During preparation of a supported catalyst system the precatalyst(s) and the activating compound(s) are immobilized simultaneously. Thus, the support component is brought into contact with the activating compound or compounds and with the precatalysts at the same time. Individual preactivation of the precatalysts by means of one or more activating compounds prior to mixing with each other is also possible.

The immobilization is generally carried out in an inert non-polar solvent. Suitable non-polar solvent are all solvents in which the precatalysts and the cocatalyst are at least partially soluble. Preferred non-polar solvents are aromatics such as benzene, toluene, and ethylbenzene, cycloalkanes, such as cyclohexane and cyclopentane, and alkanes, such as hexane, n-heptane, octane, nonane, and decane. It is especially preferred that in the first supportation step a better solvent for the transition metal is used than in the second step.

That means that in the first step preferably an aromatic or cycloalkane solvent such as benzene, toluene, ethylbenzene, cyclohexane and cyclopentane are used, while in the second step preferably an alkane solvent is used. I.e. preferred solvents in the first step are $C_{6-16}$-aromatic carbon compounds or $C_{5-20}$-cycloalkanes, which both may be substituted by $C_{1-10}$-alkyl groups and preferred solvents in the second step are $C_{5-16}$-alkanes, which may be linear or branched. As a first solvent toluene is especially preferred, and as a second solvent hexane and heptane are especially preferred.

The volume of the first solvent is added such that the total volume of the mixture is from 0.8 times, preferably more than 1.0 times to 2 times, preferably 1.5 the total pore volume of the support component. The total volume of the mixture is especially preferred from 1.05 to 1.15 times the total pore volume of the support component. Thereafter, a second solvent is added in an amount of more than 1.5 times the total pore volume of the support component, preferably of more than 2.0 times the total pore volume of the support component.

The solvent can be removed by filtration or evaporation after the immobilization. After the individual process steps, the solid can be dried. However, the use of the still moist, supported catalyst is also possible.

In a preferred method of preparing the supported catalyst system, at least one metallocene of formula (I) is brought into contact with an activating compound in a suitable solvent, e.g. toluene. The iron complex of formula (II) is likewise brought into contact with at least one activating compound, preferably MAO, in a suitable solvent, e.g. toluene. Both solutions are combined and subsequently mixed with the dehydrated or passivated support material. To the resulting supported catalyst system an additional amount of solvent is added, preferably a solvent which has a lower solubility in view of the two precatalysts, e.g. heptane. Subsequently the catalyst is preferably dried to ensure that most of the solvent is removed from the pores of the support material. The supported catalyst is preferably obtained as a free-flowing powder. Examples of the industrial implementation of the above process are described in WO 96/00243 A1, WO 98/40419 A1 or WO 00/05277 A1.

The metallocene is preferably applied in such an amount that the concentration of the metallocene in the finished catalyst system is from 1 to 200 μmol, preferably from 5 to 100 μmol and particularly preferably from 10 to 70 μmol, per g of support. The iron complex is preferably applied in such an amount that the concentration of iron from the iron complex in the finished catalyst system is from 0.1 to 20 μmol, preferably from 0.5 to 10 μmol and particularly preferably from 1 to 7 μmol, per g of support.

Preferably the activation and supportation steps are performed in a suitable solvent. Suitable solvents are aprotic solvents, in particular hydrocarbons such as aromatic hydrocarbons having 6-20 carbon atoms, e.g. toluene, ethylbenzene or xylene, or aliphatic hydrocarbons having 6-16 carbon atoms, e.g. hexane such as n-hexane or isohexane, heptane, octane or decalin or mixtures of various hydrocarbons. The activating compound is preferably present in solution, preferably in a hydrocarbon.

In a first supportation step of the present invention the precatalysts and cocatalysts present in a first amount of solvent are added in a volume of 1.05 to 1.15 times, preferably 1.05 to 1.10 times the volume of the porous support. The pore volume of the support is determined by a method as described below in the "Examples". Subsequently, in a second step a second amount of solvent is added which is more than 1.5, preferably more than 2.0 times the pore volume of the support. In any case, the pore volume of the support refers to the pore volume as measured on the dry support material.

Each of the precatalysts may be activated with the respective activating compound for a period of from 30 minutes to 8 hours, particularly preferably from 30 minutes to 3 hours, after mixing is complete. The precatalysts may be activated separately or preferably in the same solution. In case the precatalysts are activated in separate solutions the solutions are combined before addition to the support component. In the following, activation means that the active catalyst compound or precatalyst and the activating compound in the mixture are given time to react with one another. The mixture is preferably stirred during this time.

The support material is a solid, particulate, porous, organic or inorganic material. The support material is used in the form of a dry powder, i.e. it is not suspended in a solvent and the residual moisture content is less than 5% by weight, preferably less than 2% by weight and particularly preferably less than 0.5% by weight, based on moist support components.

Possible organic support materials are finely divided polyolefin powders (e.g. polyethylene, polypropylene or polystyrene) and are preferably freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. Polymer blends can also be used.

Preferably, the support materials are inorganic. Examples of inorganic supports preferred include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof. Other preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or a blanket of inert gas (e.g. nitrogen). Or the inorganic support can be calcined at temperatures of from 200 to 1000° C. to produce the desired structure of the solid and/or to set the desired OH concentration on the surface. The support can also be treated chemically using customary desiccants such as metal alkyls, preferably aluminum alkyls, chlorosilanes or $SiCl_4$, or else methylaluminoxane. The treatment of silica gel with $NH_4SiF_6$ or other fluorinating agents e.g. leads to fluorination of the silica gel surface, or treatment of silica gels with silanes containing nitrogen-, fluorine- or sulfur-containing groups leads to correspondingly modified silica gel surfaces.

Particular preference is given to using silica gels as solid support component, since particles whose size and structure make them particularly suitable as supports for olefin polymerization can be produced from this material. In particular spray-dried silica gels comprising spherical agglomerates of smaller granular particles, i.e. primary particles, have been found to be particularly useful. The silica gels can be dried and/or calcined before use.

The silica gels used are generally used as finely divided powders having a mean particle diameter D50 of from 5 to 200 µm, preferably from 10 to 150 µm, particularly preferably from 15 to 100 µm and in particular from 20 to 70 µm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and in particular from 100 to 600 m$^2$/g. Typical silica gels suitable for the process of the present invention are available in the market, e.g. from W. R. Grace & Co, Maryland, USA.

The precatalyst compound(s) is(are) preferably applied in such an amount that the concentration of the sum of precatalyst compounds is from 1 to 200 µmol, preferably from 10 to 150 µmol and particularly preferably from 10 to 80 µmol, per g of support component.

The support component can also be brought into contact with an organometallic compound before being brought into contact with the mixture from step A). Preferred organometallic compounds are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization.

The catalyst systems of the invention are suitable for the polymerization of olefins and especially for the polymerization of α-olefins, i.e. hydrocarbons having terminal double bonds. Suitable monomers also include functionalized olefinically unsaturated compounds such as acrolein, ester or amide derivatives of acrylic or methacrylic acid, for example acrylates, methacrylates or acrylonitrile, or vinyl esters, for example vinyl acetate. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,5-hexadiene or 1,7-octadiene or vinylaromatic compounds such as styrene or substituted styrene. It is also possible to polymerize mixtures of various α-olefins. Preference is given to polymerizing at least one olefin selected from the group consisting of ethene, propene, 1-butene, 1-pentene, 1-hexene, 1-heptene, 1-octene and 1-decene. Suitable olefins also include ones in which the double bond is part of a cyclic structure which can have one or more ring systems. Examples are cyclopentene, cyclohexene, norbornene, tetracyclododecene and methylnorbornene and dienes such as 5-ethylidene-2-norbornene, norbornadiene or ethylnorbornadiene.

Mixtures of two or more olefins can also be polymerized. In particular, the catalyst systems of the invention can be used for the polymerization or copolymerization of ethene or propene. As comonomers in the polymerization of ethene, preference is given to using $C_3$-$C_8$-α-olefins or norbornene, in particular 1-butene, 1-pentene, 1-hexene and/or 1-octene. Preference is given to using monomer mixtures containing at least 50 mol % of ethene. Preferred comonomers in the polymerization of ethene are 1-propene and/or 1-butene.

The polymerization can be carried out in a known manner in bulk, in suspension, in the gas phase or in a supercritical medium in the customary reactors used for the polymerization of olefins. It can be carried out batchwise or continuously in one or more stages. High-pressure polymerization processes in tube reactors or autoclaves, solution processes, suspension processes, stirred gas-phase processes or gas-phase fluidized-bed processes are all possible.

The polymerizations are usually carried out at temperatures in the range from −60 to 350° C. and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. The polymerization temperatures are generally in the range from −20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C.

The transition metal complexes used according to the invention and the catalyst systems in which they are present can also be produced by means of combinations of methods or their polymerization activity can be tested with the aid of these combined methods.

The process of the invention allows polymers of olefins to be prepared. The term "polymerization" as used here in the description of the invention encompasses both polymerization and oligomerization, i.e. oligomers and polymers having molar masses $M_w$ in the range from about 56 to 10 000 000 g/mol can be produced by this process.

The catalyst systems of the invention give a very high productivity in the polymerization of olefins, offer advantages in the metering of the catalyst system into the polymerization reactor and lead to significantly fewer problems in respect of catalyst residues in the polymer. The polymers prepared using the catalyst system of the present invention are particularly useful for applications which require a high product purity. In addition, the catalyst systems of the invention display a very good activity even at a relatively low molar ratio of aluminoxane to organic transition metal compound.

EXAMPLES

Reagents

Polyolefin catalyst carrier XPO-2326, a spray-dried silica gel from Grace, was calcinated at 600° C. for 6 hours. The pore volume of the support was determined to 1.54 ml/g.

Determination of Pore Volume

Throughout the whole application the pore volume refers to a value measured as follows: Water is added in portions to the pulverulant substance to be tested with constant mixing until all pores are saturated with liquid, which is evident from the powder losing its flowability and starting to form lumps. The volume of liquid required per gram of sample corresponds to the pore volume of the sample. For the purposes of the invention, the pore volume was determined as follows: 5 g of the substance to be tested were weighed cut into a dry powder bottle (150 ml) with screw cap. Distilled water was added in portions (initially 2 ml, then less and less) from a burette, the bottle was sealed with the screw cap, and the contents were mixed by vigorous shaking. The bottle was then placed vigorously on a cork mat and subsequently rotated. When about ⅓ of the sample remains stuck to the base of the bottle during this operation, the pores are saturated. The water consumption was read off and converted to 1 g of the sample. The standard deviation of the pore measurement values is ±0.02 ml/g.

Methylalumoxane (MAO) was received from Chemtura as a 30% wt/wt toluene solution.

Bis(n-butylcyclopentadienyl)hafnium dichloride is commercially available from Crompton.

Bis(1-n-butyl-3-methylcyclopentadienyl)zirconium dichloride is commercially available from Albemarle Inc.

2,6-Diacetylpyridinebis(2,4,6-trimethylphenylanil)iron dichloride was prepared by the method of Qian et al., Organometallics 2003, 22, 4312-4321. Here, 65.6 g of 2,6-diacetylpyridine (0.4 mol), 170 g of 2,4,6-trimethylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solid was distilled off from the resulting filtrate, the residue was admixed with 200 ml of methanol and subsequently stirred at 55° C. for 1 hour. The suspension formed in this way was filtered and the solid obtained was washed with methanol and freed of the solvent. This gave 95 g of 2,6-diacetylpyridinebis (2,4,6-trimethylphenylanil) in a yield of 47%. The reaction with iron(II) chloride was carried out as described by Qian et al., Organometallics 2003, 22, 4312-4321.

2,6-diacetylpyridinebis(2-chloro-4,6-dimethylphenylanil) iron dichloride was prepared in analogous manner to 2,6-diacetylpyridinebis(2,4,6-trimethylphenylanil)iron dichloride Determination of the distribution of single elements in the catalyst is performed by "linescan" method, i.e. by Electron Microprobe Analysis (EMPA):

The catalyst samples were mixed into a cast resin. After curing the cast resin products were grinded and polished. Thus, lateral cuts of the catalyst particles were obtained. For getting a conducting surface of the sample the samples were sputter coated with gold. A finely focused (approx. 1 micron) beam of electrons was directed onto the flat polished specimen for measuring concentrations of elements with a spacial resolution of less than 1 μm. Subsequently, the focussed electron beam of an electron micro probe analyser is moved linearly along the sample with a constant velocity. Determination of the single elements was obtained by the high energy electrons which ionized the inner shells of the target elements in the sample. The decay of the ionized state resulted in the emission of characteristic x-rays. Using Bragg's and Moseley's laws the energy spectrum of x-rays was determined for identification of the wavelengths of the elements of the catalyst sample. Quantitative analysis was accomplished by measuring the intensity of the characteristic wavelengths for each element in the sample. The unknown sample intensities were then compared to intensities measured on standard reference materials of known compositions. The detection of the element specific X-rays makes a relative characterization of the electron homogeneity possible. By scanning the sample a correlated local microanalysis was obtained, which showed the gradient of concentration of the elements along the total lateral cut of the particle. A comparison of the obtained local element distribution and the respective electron optical picture showed a good correlation to the morphologic variations along the lateral cut of the particle.

Example 1

A solution of 2587.8 mg of bis(1-n-butyl-3-methylcyclopentadienyl)zirconiumdichloride and 261.4 mg of 2,6-diacetylpyridinebis(2,4,6-trimethylphenylanil)iron dichloride in 122.9 ml MAO and 28.3 ml toluene was prepared. The solution was added to 99.7 g of the pretreated support material at 0° C. The ratio of the total volume of the added solution to the pore volume of the support was 1.05.

A wet powder was obtained which was not free flowing. After the catalyst had been stirred for two hours at 10° C., 275 ml heptane were added to form a slurry. The solution was filtered under argon and dried under an argon flow. 198.5 g of catalyst were obtained. The powder had light ivory colour. The loading of the bis(1-n-butyl-3-methylcyclopentadienyl)zirconiumdichloride is 60 µmol/g, that of 2,6-diacetylpyridinebis(2,4,6-trimethylphenylanil)iron dichloride 5 µmol/g and the Al/(bis(1-butyl-3-methylcyclopentadienyl)zirconiumdichloride+2,6-diacetylpyridinebis(2,4,6-trimethylphenylanil)iron dichloride) molar ratio is 95:1.

Figure 1:
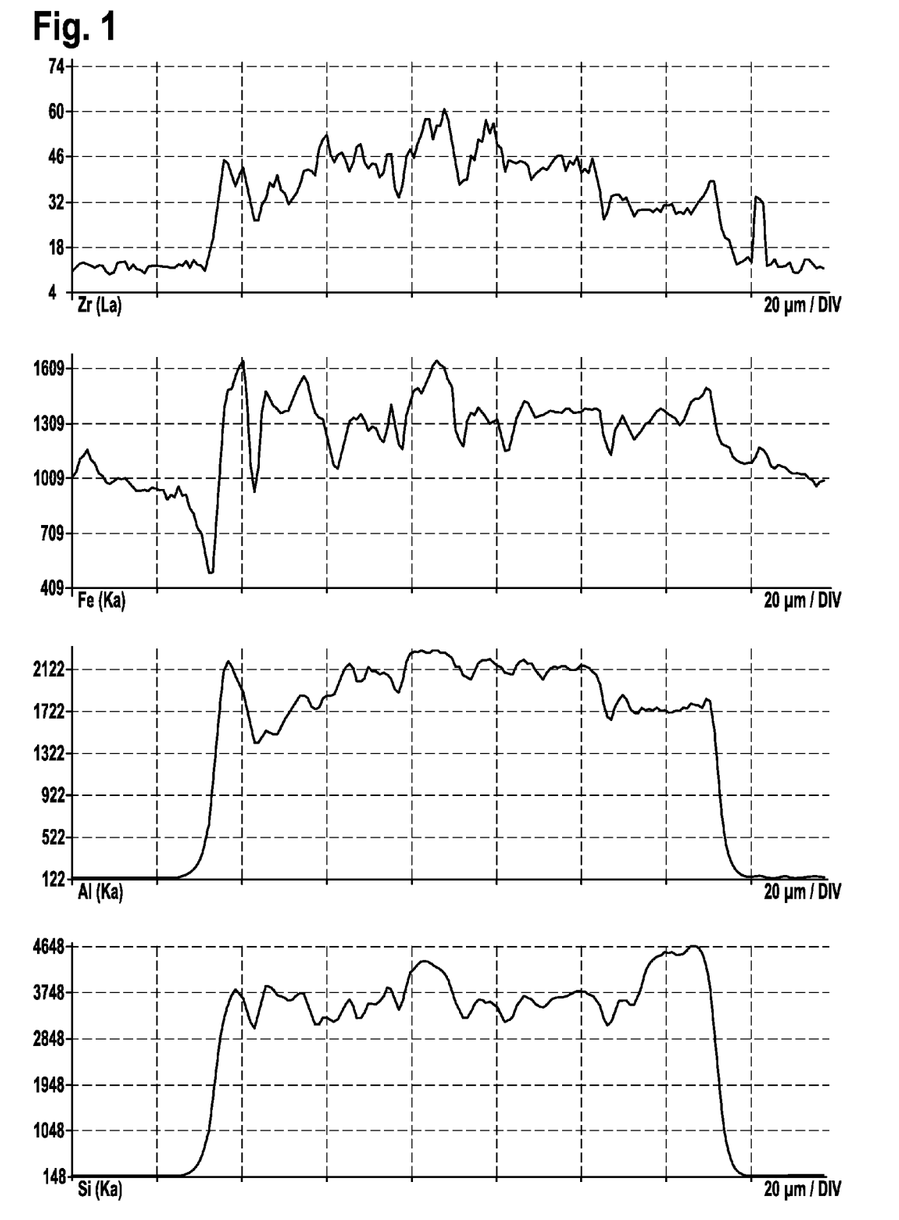
FIG. 1 illustrates the distribution of the single elements on the support of Example 1, as measured by linescan.

The distribution of the single elements on the support as measured by linescan is shown in FIG. 1.

Example 2

Figure 2:
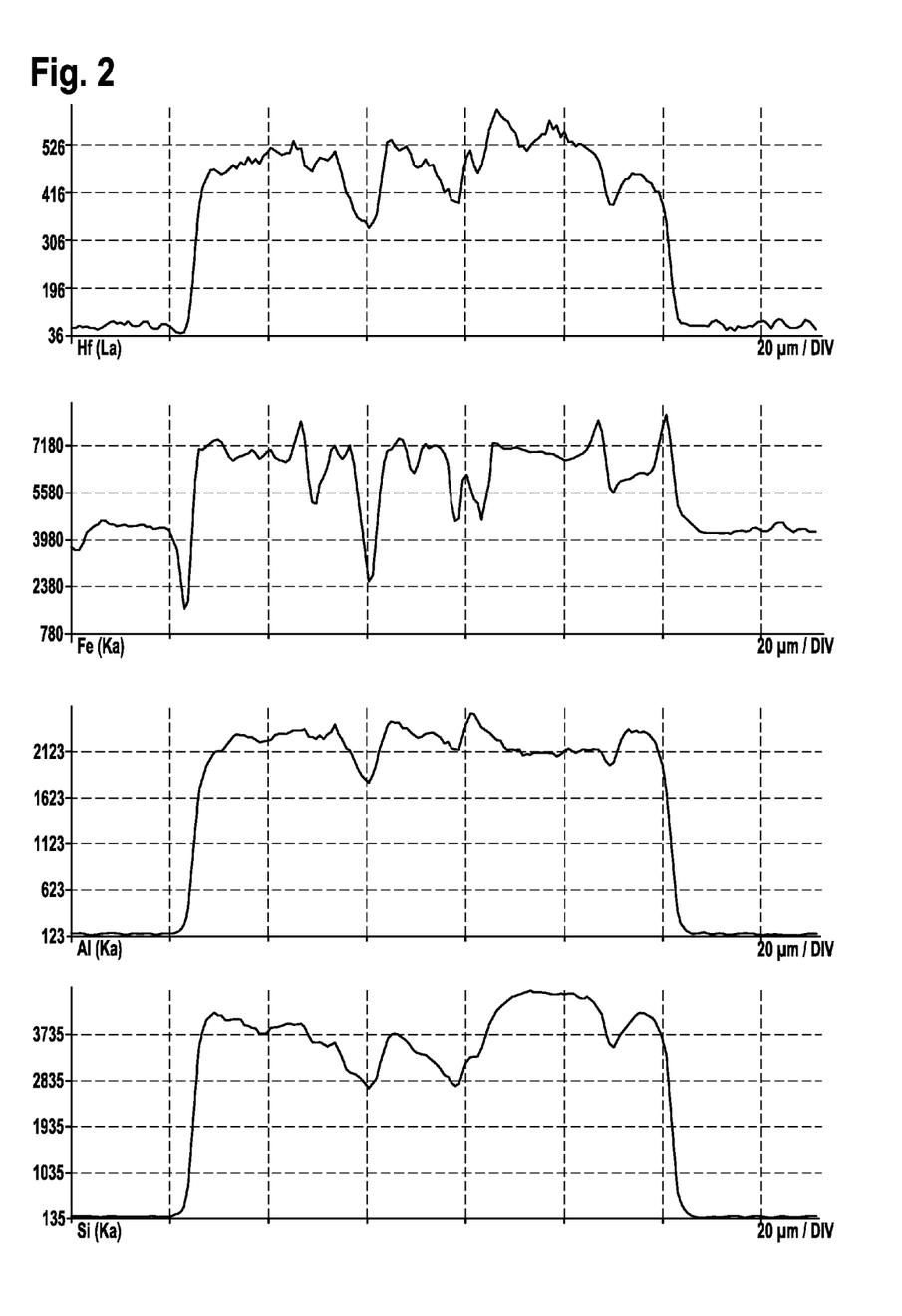
FIG. 2 illustrates the distribution of the single elements on the support of Example 2, as measured by linescan.

A solution of 2759.0 mg of bis(1-n-butyl-cyclopentadienyl)hafniumdichloride and 301.2 mg of 2,6-diacetylpyridinebis(2-chloro-4,6-dimethylphenylanil)iron dichloride in 122.9 ml MAO and 28.3 ml toluene was prepared. The solution was added to 93.5 g of the pretreated support material at 0° C. The ratio of the total volume of the added solution to the pore volume of the support was 1.05. A wet powder was obtained which was not free flowing. After the catalyst had been stirred for two hours at 10° C., 275 ml heptane were added and a slurry with the catalyst was formed and stirred for about one hour. The slurry was filtered under argon and dried under an argon flow. 168.0 g of catalyst were obtained. The powder had light ivory colour. The loading of the bis(1-n-butylcyclopentadienyl)hafniumdichloride is 60 µmol/g, that of 2,6-diacetylpyridinebis(2-chloro-4,6-dimethylphenylanil)iron dichloride 5.7 µmol/g and the Al/(bis(1-n-butylcyclopentadienyl)hafnium dichloride+2,6-diacetyl pyridinebis(2-chloro-4,6-dimethylphenylanil)iron dichloride) molar ratio is 95:1. The obtained catalyst was analysed by linescan. The distribution of the single elements on the support as measured by linescan is shown in FIG. 2.

Comparative Example C1

Figure 3:
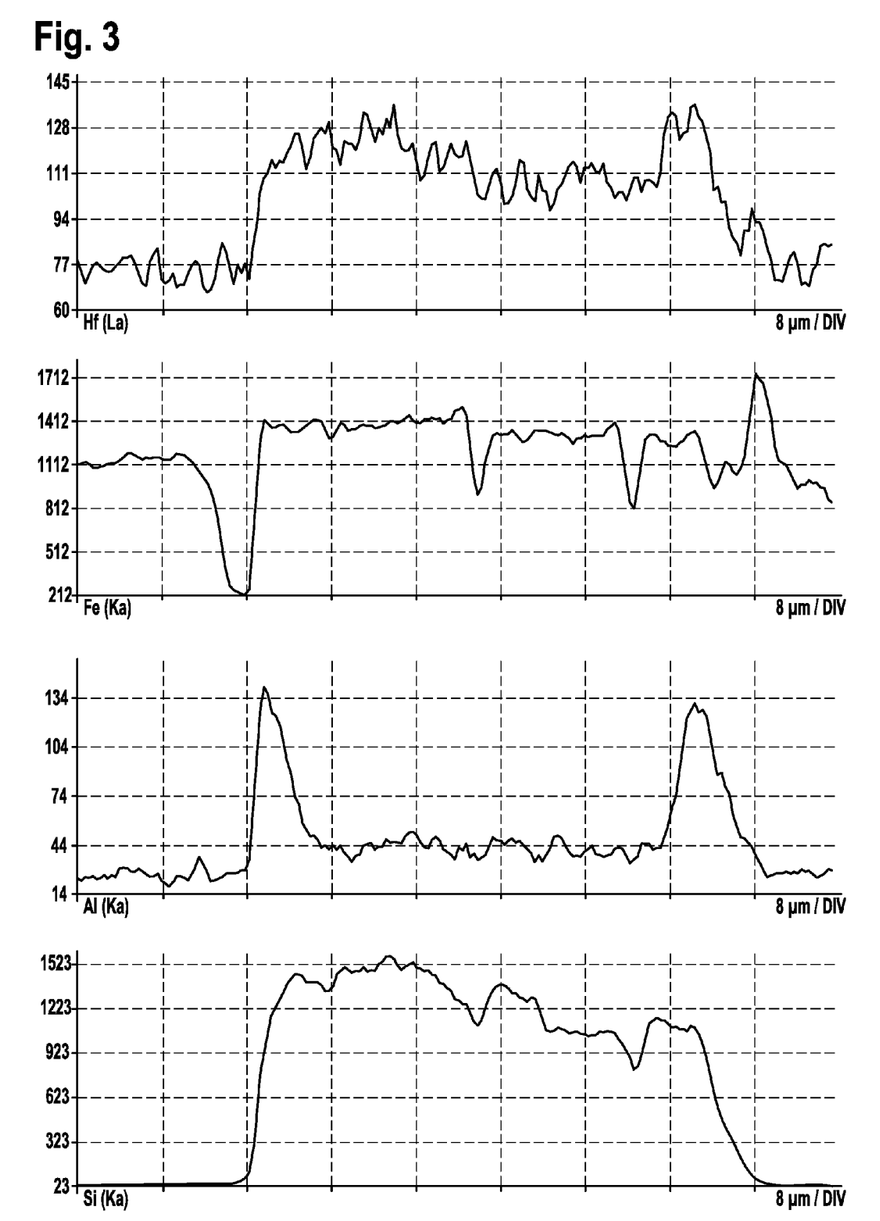
FIG. 3 illustrates the distribution of the single elements on the support of Comparative example C1, as measured by linescan.

A solution of 472.1 mg of bis(n-butylcyclopentadienyl)hafnium dichloride and 49.7 mg of 2,6-diacetylpyridinebis(2-chloro-4,6-dimethylphenylanil)iron dichloride in 19.9 ml of MAO (4.75 M in toluene) was prepared. The solution was added to 16.0 g of the pretreated support material at 0° C. The ratio of the total volume of the added solution to the pore volume of the support was 0.9. A dry powder was obtained which was stirred at 10° C. for two hours. The catalyst was obtained as a dry powder with a light ivory colour. The loading of bis(n-butylcyclopentadienyl)hafnium dichloride is 60 µmol/g, that of 2,6-diacetylpyridinebis(2-chloro-4,6-dimethylphenylanil)iron dichloride 5.5 µmol/g and the Al/(bis(n-butylcyclopentadienyl)hafnium dichloride+2,6-diacetylpyridinebis(2-chloro-4,6-dimethylphenylanil)iron dichloride) molar ratio is 90:1. The obtained catalyst was analysed by linescan. The distribution of the single elements on the support as measured by linescan is shown in FIG. 3.

Polymerization

A 1.7-l-Steelautoclave was filled under Argon at 70° C. with 100 g polyethylene powder (which was already dried at 80° C. for 8 hours in vacuum and stored under Argon atmosphere) having a particle size of >1 mm. 125 mg Triisobutylaluminum (TiBAl in heptane 50 mg/ml), 6.5 ml heptane as well as 50 mg Costelan AS 100 (Costelan in heptane 50 mg/ml) were added. After 5 minutes of stirring catalyst was added and the catalyst dosing unit was rinsed with 2 ml heptane. First the pressure was increased up to 10 bar at 70° C. with nitrogen, then a pressure of 20 bar was adjusted with ethylene and hexene fed in constant ratio to ethylene 0.1 ml/g. The pressure of 20 bar at 70° C. was kept constant for 1 hour via adding additional ethylene and hexene, fed in constant ratio to ethylene 0.1 ml/g, during the polymerization. After one hour the pressure was released. The polymer was removed from the autoclave and sieved in order to remove the polymer bed. The polymerization results are shown in the following table. It is evident that the polymer products are very similar independently of the supportation method of the catalyst. However, during polymerization of comparative catalyst 1 of example 3 deposits appeared on the reactor walls which leads to operability problems in production plants.

| Example | Catalyst | Fr [%] | Al [%] | M [%] | Si [%] | Cat. [mg] | Hexene [ml] | Polymer ex. [g] | Productivity [g/g] | IV [dl/g] | IR: Vinyl group [1/1000] | IR: hexene [%] |
|---|---|---|---|---|---|---|---|---|---|---|---|---|
| 1 | Catalyst 1 | 0.02 | 9.00 | Zr 0.29 | 26.1 | 214 | 21 | 194 | 907 | 3.2 | 0.15 | 3.7 |
| 2 | Catalyst 2 | 0.03 | 8.90 | Hf 0.56 | 25.8 | 170 | 17 | 148 | 871 | 1.69 | 1.37 | 3.5 |
| 1C | Comp. catalyst | 0.03 | 8.60 | Hf 0.54 | 24.3 | 194 | 18 | 184 | 947 | | 1.03 | 3.8 |

The invention claimed is:

1. A process comprising:
preparing a catalyst system, wherein the preparing step comprises the steps of:
A) impregnating a porous support component with a mixture comprising:
(a) a precatalyst, wherein the precatalyst comprises a metallocene and an iron complex,
(b) at least one cocatalyst, and
(c) a first solvent to form an immobilized catalyst component, wherein the porous support component has a total pore volume from 0.1 to 10 cm$^3$/g, and a residual moisture content less than 5 wt. %, based upon the total weight of the porous support component, wherein the total volume of the mixture is from 0.8 to 2.0 times the total pore volume of the porous support component;
B) adding a second solvent to the immobilized catalyst component, wherein the second solvent is a $C_{5-16}$ alkane; and
C) removing the solvent by filtration or evaporation.

2. The process of claim 1, wherein the first solvent is selected from the group consisting of a $C_{6-16}$ aromatic hydrocarbon, a $C_{1-10}$-alkyl substituted $C_{6-16}$ aromatic hydrocarbon, a $C_{5-20}$ cycloalkane, and a $C_{1-10}$-alkyl substituted $C_{5-10}$ cycloalkane.

3. The process of claim 2, wherein the first solvent is toluene, and the second solvent is heptane.

4. The process of claim 1, wherein the first solvent is added such that the total volume of the mixture is 1.0 to 2.0 times the total pore volume of the porous support component.

5. The process of claim 1, wherein the support component is a silica gel.

6. The process of claim 1, wherein the cocatalyst is an aluminoxane.

7. The process of claim 1, wherein the metallocene is present in the catalyst system in an amount from 1 to 200 µmol per gram of porous support component.

8. The process of claim 7, wherein the iron complex is present in the catalyst system in an amount from 0.1 to 20 µmol per gram of porous support component.

9. The process of claim 1, comprising the step of polymerizing or copolymerizing at least one alpha-olefin in the presence of the catalyst system.

* * * * *